United States Patent
Lee et al.

(10) Patent No.: US 10,625,671 B2
(45) Date of Patent: Apr. 21, 2020

(54) ENGINE SOUND COLOR CONTROL METHOD BASED ON ENGINE DYNAMIC CHARACTERISTIC WITH ARTIFICIAL INTELLIGENCE AND VEHICLE THEREOF

(71) Applicants: Hyundai Motor Company, Seoul (KR); Kia Motors Corporation, Seoul (KR)

(72) Inventors: Dong-Chul Lee, Gyeonggi-do (KR); In-Soo Jung, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 340 days.

(21) Appl. No.: 15/835,777

(22) Filed: Dec. 8, 2017

(65) Prior Publication Data

US 2019/0111839 A1  Apr. 18, 2019

(30) Foreign Application Priority Data

Oct. 17, 2017 (KR) .......................... 10-2017-0134561

(51) Int. Cl.
| | | |
|---|---|---|
| *B60Q 5/00* | (2006.01) | |
| *B60W 50/08* | (2020.01) | |
| *G06N 20/00* | (2019.01) | |
| *G10K 15/04* | (2006.01) | |
| *G10K 15/02* | (2006.01) | |

(52) U.S. Cl.
CPC .............. *B60Q 5/005* (2013.01); *B60W 50/08* (2013.01); *G06N 20/00* (2019.01); *G10K 15/04* (2013.01); *G10K 15/02* (2013.01); *G10K 2210/51* (2013.01)

(58) Field of Classification Search
CPC ........ B60Q 5/005; B60Q 5/008; G06N 20/00; B60W 50/08; G10K 15/04; G10K 2210/51

See application file for complete search history.

(56) References Cited

U.S. PATENT DOCUMENTS

| | | | | |
|---|---|---|---|---|
| 8,938,079 B2 * | 1/2015 | Valeri | ..................... | G10K 15/02 |
| | | | | 340/384.3 |
| 9,388,776 B2 * | 7/2016 | Valeri | ...................... | B60Q 9/00 |
| 9,478,214 B2 * | 10/2016 | Orth | ......................... | G10K 15/02 |
| 9,836,574 B2 * | 12/2017 | Willard | .................. | B60K 37/02 |
| 9,944,127 B2 * | 4/2018 | Every | ........................ | B60C 9/00 |
| 9,990,913 B2 * | 6/2018 | Zintel | .................... | G10K 15/02 |

FOREIGN PATENT DOCUMENTS

KR   10-2017-0002973 A   1/2017

* cited by examiner

*Primary Examiner* — Todd M Melton
(74) *Attorney, Agent, or Firm* — Mintz Levin Cohn Ferris Glovsky and Popeo, P.C.; Peter F. Corless

(57) ABSTRACT

An engine sound color control method based on an engine dynamic characteristic with artificial intelligence is provided. The method maximizes audio-visual control through the audio-visual synergy effect by performing both of the visual control of the dash board by the artificial intelligence using the virtual engine revolution per minute based on the shifting event and driving pattern of a vehicle. In particular, the auditory control of the speaker is operated by the signal processing controller based on the virtual engine RPM in response to an engine vibration signal of the engine. Further, a driver is provided with rapid response with vehicle power performance control through a real-time audio-visual change regulated by the artificial intelligence.

19 Claims, 9 Drawing Sheets

ENGINE SOUND COLOR CONTROL METHOD BASED ON ENGINE DYNAMIC CHARACTERISTIC WITH ARTIFICIAL INTELLIGENCE AND VEHICLE THEREOF

CROSS-REFERENCE TO RELATED APPLICATIONS

This application claims priority to Korean Patent Application No. 10-2017-0134561, filed on Oct. 17, 2017, which is incorporated herein by reference in its entirety.

BACKGROUND

Field of the Disclosure

The present disclosure relates to engine sound color control of a vehicle and, more particularly, to an engine sound color control vehicle that has specific engine characteristics and achieves an audio-visual synergy effect through audio-visual control using an artificial intelligence.

Description of Related Art

Recently, an engine sound color control of a vehicle that has been increasingly applied to vehicles improves the driving experience (hereafter, referred to as fun-to-drive) through auditory and visual senses and increases the commercial quality of vehicles. For example, the engine sound color control of a vehicle includes a virtual sound source generation type and a type of using virtual engine Revolution Per Minute (RPM) type. For example, the virtual sound source generation type uses an auditory effect that provides interior sound from a recorded virtual sound source. The virtual engine RPM type uses a virtual effect of a quick response misunderstanding effect due to rapid progress of a changing speed (e.g., a speed decrease and a speed increase) of engine RPM to improve fun-to-drive of a driver.

In particular, the virtual sound source generation type requires a recorded virtual sound and an engine sound equalizer that adjusts volume on the basis of a load change generated while a vehicle is driven. The virtual RPM type requires a control of a cluster (e.g., a dashboard) that virtually rapidly progress engine RPM.

The matters described as the related art have been provided merely for assisting in the understanding for the background of the present disclosure and should not be considered as corresponding to the related art known to those skilled in the art.

SUMMARY

An object of the present disclosure provides the engine sound control of a vehicle that does not combine and control the auditory effect of the virtual sound source generation type and the visual effect of the virtual RPM type. In particular, the virtual sound source generation type produces interior sound from a recorded virtual sound source, independent of dynamic characteristic of an engine corresponding to the actual driving of a vehicle.

An additional object of the present disclosure provides an engine sound color control method based on an engine dynamic characteristic with artificial intelligence and a vehicle thereof. The method and vehicle may maximize an audio-visual synergy effect through artificial intelligence learning a driving patter by performing change speed visualization control using optimal visual extraction virtual RPM together with real-time sound control using auditory extraction volume in proportion to engine RPM based on an engine vibration signal. In particular, the method and vehicle may provide a driver with rapid response sensation with simple vehicle power performance control through a real-time audio-visual change regulated by the artificial intelligence.

In an aspect of an exemplary embodiment of the present disclosure, an engine sound color control method may include applying, by a signal process controller, a virtual engine RPM to visual control of a dashboard; applying, by the signal process controller, an engine dynamic characteristic to auditory control of a speaker. The virtual engine RPM may be based on a shifting event and a driving pattern by an artificial intelligence and the engine dynamic characteristic may be based on an engine vibration signal by a signal processing controller.

In an exemplary embodiment, a virtual engine RPM change may be detected by learning the shifting event, an interior target sound may be set by the driving pattern in real time and the virtual engine RPM may be determined by combining the virtual engine RPM change and the interior target sound. Additionally, virtual engine RPM change may be based on an engine RPM actual measurement value of the shifting event, and the engine RPM actual measurement value may be divided into an engine RPM actual measurement value for each shifting pattern and an engine RPM actual measurement value for each acceleration pattern.

In other exemplary embodiments, the auditory control may implement a plurality (e.g., at least two or more) of sound colors by distinguishing sound. The sound may be distinguished by combining the virtual engine RPM, a gear stage number, and an accelerator pedal position with the engine vibration signal. The sound may be distinguished by switching. The auditory control may reflect low-frequency noise and the low-frequency noise may be reflected after the sound is determined.

In another aspect of an exemplary embodiment, a vehicle may include an engine sound color generation device that implements both of visual control and auditory control. The engine sound color generation device may include a signal processing controller configured to receive an engine vibration signal according to operation of an engine, artificial intelligence configured to set virtual engine RPM by learning a shifting event and determining a driving pattern, a vehicle sensor configured to detect and transmit the engine vibration signal to the signal processing controller, a visual device configured to implement visual control based on the virtual engine RPM and an auditory device configured to implement auditory control by combining the virtual engine RPM with the engine vibration signal.

In some exemplary embodiments, the artificial intelligence may be configured to detect a virtual engine RPM change based on an engine RPM actual measurement value by learning the shifting event, determine a target interior sound by determining the driving pattern in real time, determine the virtual engine RPM based on the virtual engine RPM change and the target interior sound, and determine the engine RPM actual measurement value into an engine RPM actual measurement value for each shifting pattern and an engine RPM actual measurement value for each acceleration pattern.

The signal processing controller may be configured to combine the virtual engine RPM, a gear stage number, and an accelerator pedal position with the engine vibration signal in the auditory control, and may be configured to perform the auditory control by determining dynamic sound to which low-frequency noise is applied and high-class sensation sound, determine the dynamic sound and the high-class sensation sound by switching, and reflect the low-frequency noise to PID output.

The vehicle sensor may include a vibration sensor configured to detect the engine vibration signal or a pressure sensor configured to measure intake pressure or exhaust pressure of the engine. The visual device may be a dashboard and the auditory device may be a speaker and the speaker may be an engine compartment speaker, an interior speaker, or an audio speaker.

BRIEF DESCRIPTION OF THE DRAWINGS

The above and other features of the present disclosure will now be described in detail with reference to exemplary embodiments thereof illustrated the accompanying drawings which are given hereinbelow by way of illustration only, and thus are not limitative of the present invention, and wherein.

DETAILED DESCRIPTION

Hereinafter, embodiments of the present disclosure are described in detail with reference to the accompanying drawings and the embodiments are only example and can be implemented in various ways by those skilled in the art, so the present disclosure is not limited to the embodiments.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 1:
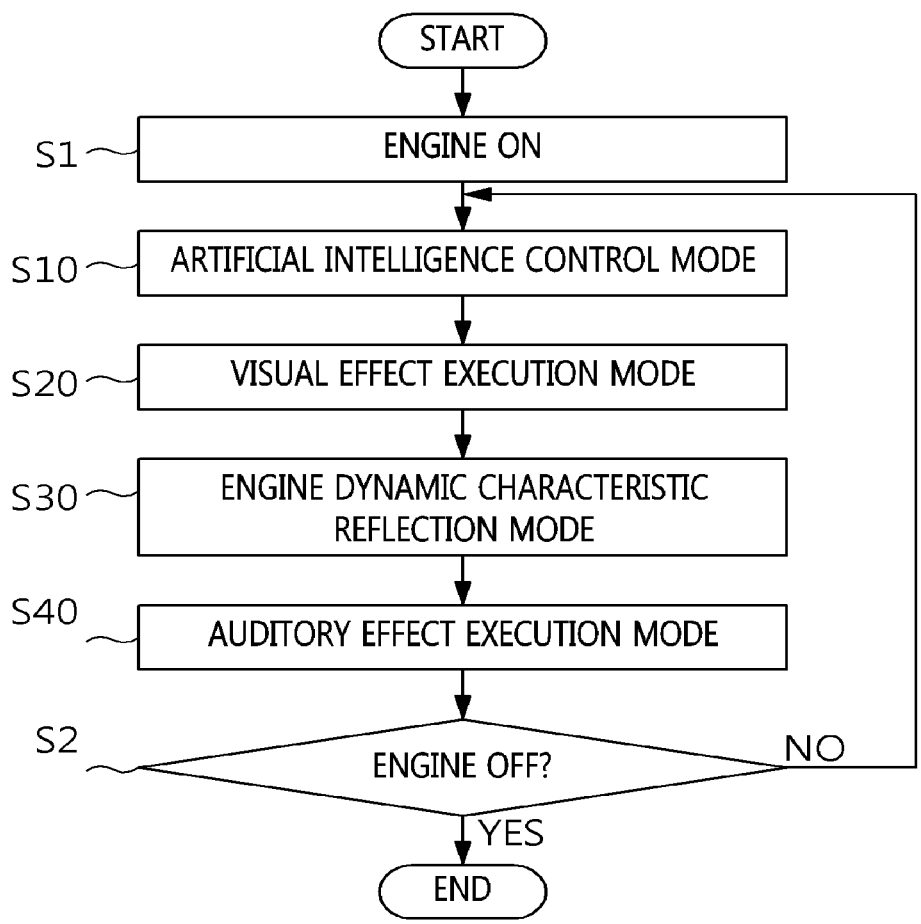
FIG. 1 is an exemplary flowchart illustrating an engine sound color control method based on engine dynamic characteristic with an artificial intelligence according to an exemplary embodiment of the present disclosure.

Referring to FIG. 1, an engine sound color control method implements may be implemented in real time as a vehicle sound color control technology maximizing an audio-visual synergy effect by an artificial intelligence control mode of S10 implementing an auditory effect execution mode of S40 to which an engine dynamic characteristic reflection mode together with a visual effect execution mode of S20 between an engine start-ON of S1 and an engine start-OFF of S2.

In particular, the engine sound color control method may be based on an artificial intelligence and may be characterized having the artificial intelligence that maximizes an a synergy effect of an auditory effect and a visual effect by learning driver's driving pattern, extracting virtual engine revolution per minute (RPM) information optimizing visual sense by determining engine RPM information for vehicle sound color control for each shifting event, extracting in real time an engine order component that is a main factor of a vehicle interior sound color in a vibration signal representing an engine power performance, and adjusting volume in proportion to the engine RPM together with a sound color using the learning and extracting values.

Figure 2:
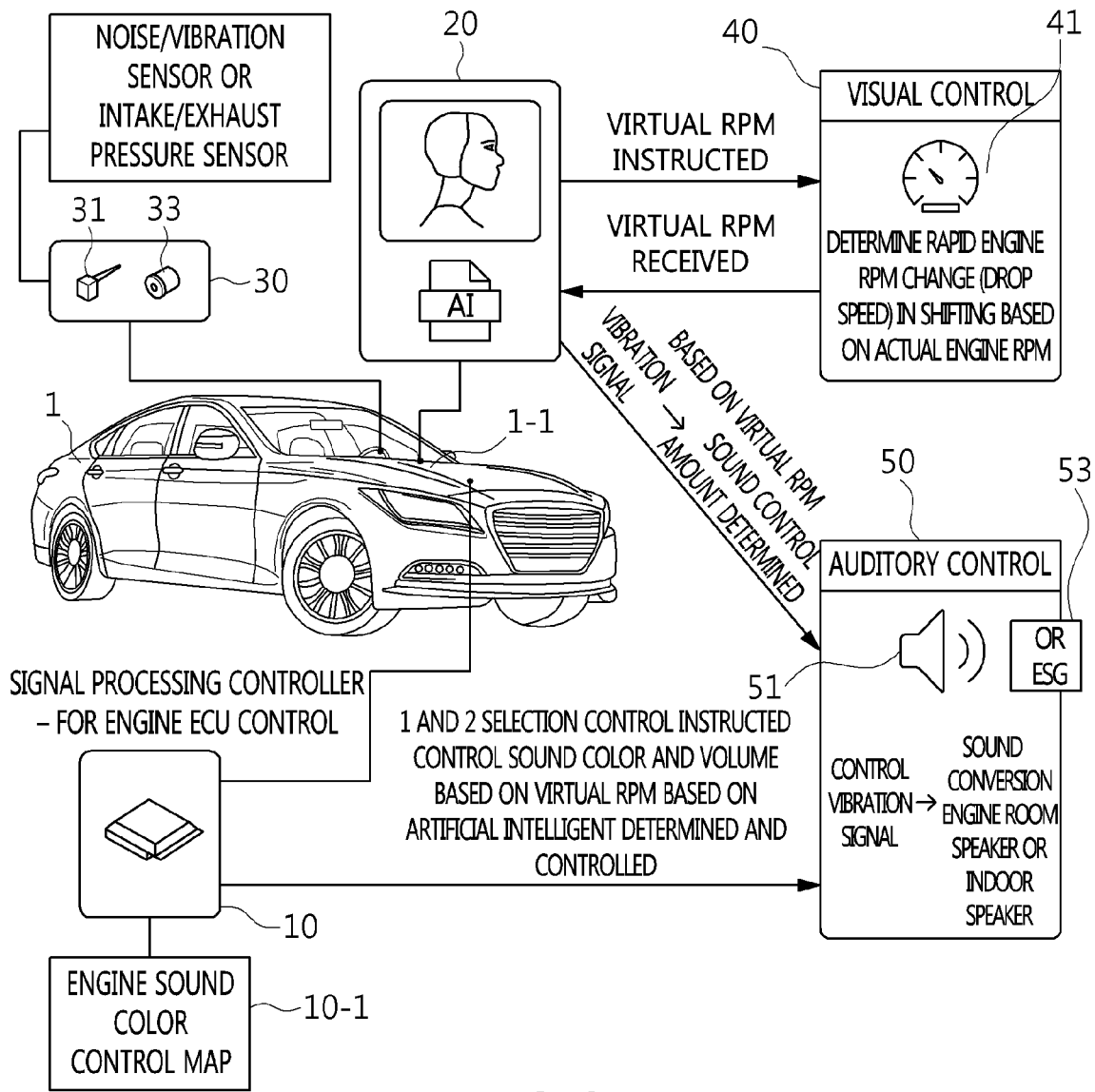
FIG. 2 is an exemplary view showing an example of a vehicle having the engine sound color control method according to an exemplary embodiment of the present disclosure.

Referring to FIG. 2, a vehicle 1 may include an engine 1-1 that is an internal combustion engine for generating power for the vehicle, and an engine sound color production system may include a signal processing controller 10, an artificial intelligence 20, a vehicle sensor 30, a visual device 40, and an auditory device 50. For example, the signal processing controller 10, artificial intelligence 20, vehicle sensor 30, visual device 40, and auditory device 50 include exemplary embodiments described below.

The signal processing controller 10 may be configured to operate the engine 1-1 by processing a detection signal of the vehicle sensor 30 into input data, may have an engine sound color control map 10-1, and may be configured to operate the visual device 40 and the auditory device 50 in connection with the artificial intelligence 20. In particular, the signal processing controller 10 may be configured to perform controller area network database CAN DB information transmission/reception and signal processing for virtual engine RPM control, calculate virtual engine RPM information for rapid shifting sense, and output an audio-visual information control signal. The engine sound color control map 10-1 may include a visual matching graph and an auditory matching graph respectively for a virtual engine RPM calculation value and a target value and may provide the graph to the signal processing controller 10.

The artificial intelligence 20 may include an artificial intelligence algorithm based on deep learning (e.g., machine learning) for artificial intelligence processing and may be configured to input and output control data for the signal processing controller 10, the visual device 40, and the auditory device 50.

The vehicle sensor 30 may include a vibration sensor 31 or a pressure sensor 33, in addition to basic sensors configured to detect operation of the engine 1-1 and detect a shifting pattern. The vibration sensor 31 may be an engine vibration signal measurer that may include as a microphone vibrometer. The pressure sensor 30 may be an intake air or exhaust gas pressure measurer for example, an intake measurer or an exhaust measurer and may be configured to operate the auditory device 50 with an engine vibration-based wound considering a change in virtual engine RPM.

The visual device 40 may be configured to perform CAN DB information transmission/reception, perform virtual engine RPM information transmission/reception for rapid shifting sense, and calculate value display, and perform visualization using a dashboard 41. The audio device 50 may be configured to output engine vibration-based sound based on a virtual engine RPM change and may include a speaker 51 configured to generate sound or an electrically suspended gyro (ESG) 53 to generate sound. In particular, the speaker 51 may be an engine compartment speaker, an interior speaker, and an audio speaker.

Figure 3:
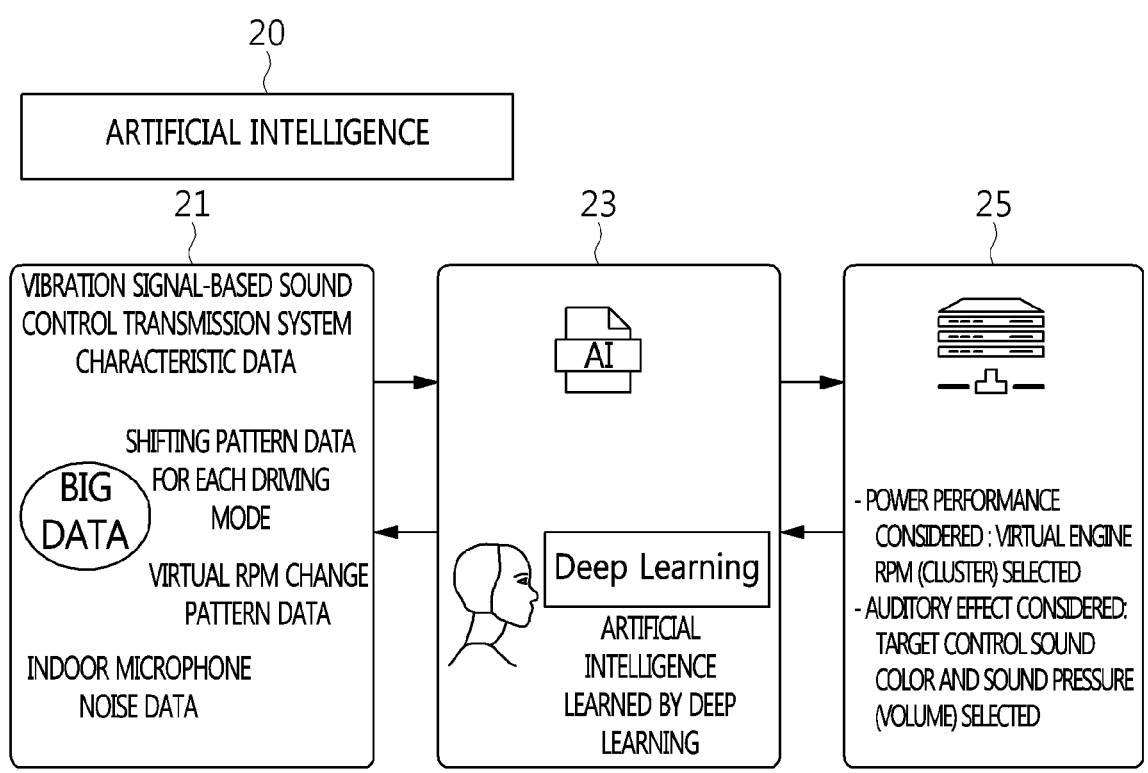
FIG. 3 is an exemplary view showing an artificial intelligence system according to an exemplary embodiment of the present disclosure.
Figure 4:
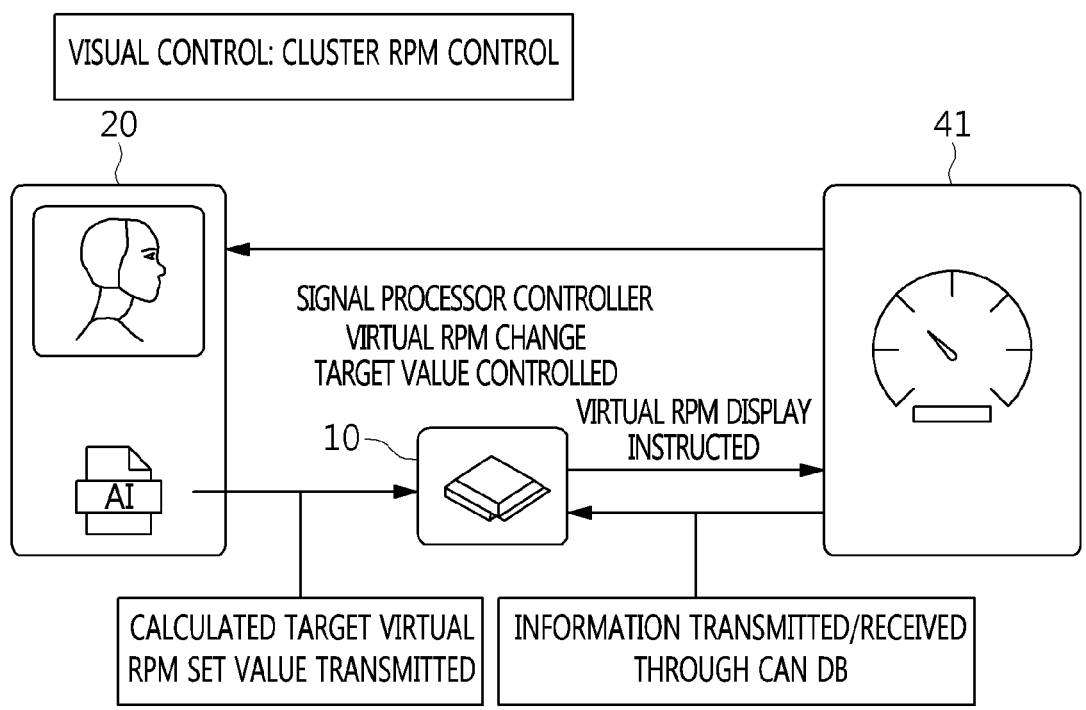
FIG. 4 is an exemplary view showing a system connection state for implementing a visual effect of a vehicle according to an exemplary embodiment of the present disclosure.
Figure 5:
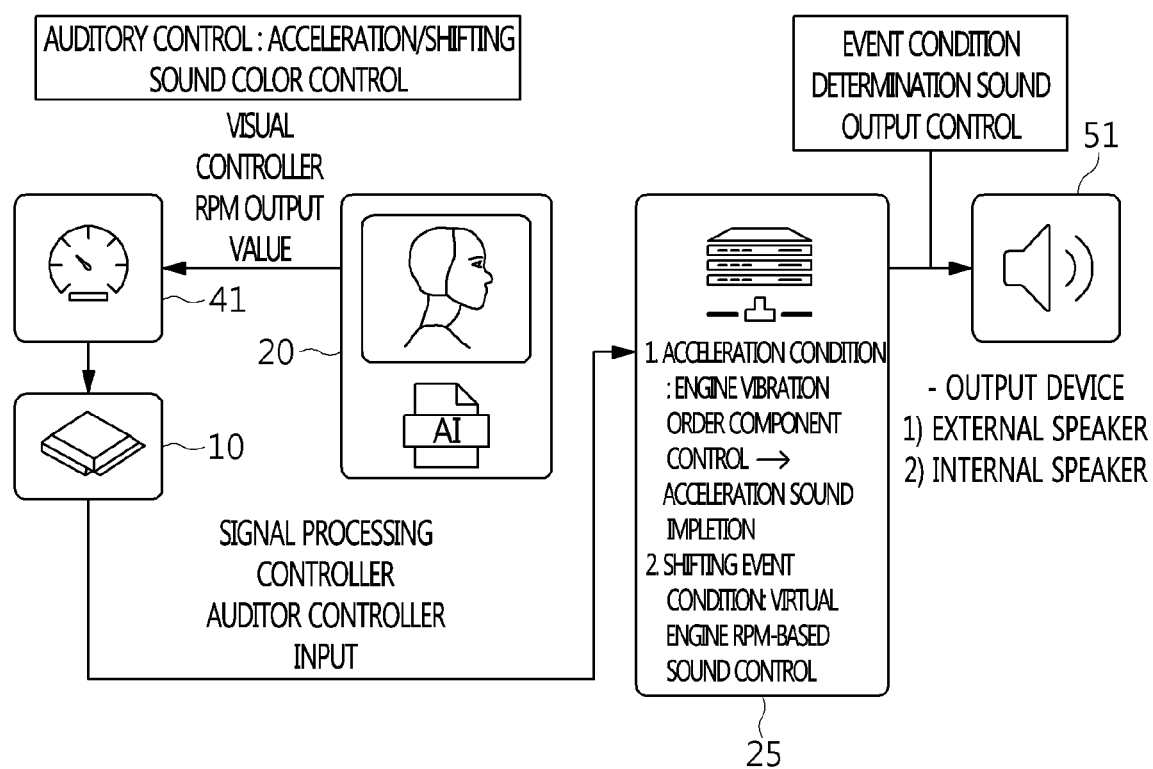
FIG. 5 is an exemplary view showing a system connection state for implementing an auditory effect in which sound color/volume is controlled on the basis of an engine dynamic characteristic based on a vibration system in response to shifting and acceleration signals of a vehicle according to an exemplary embodiment of the present disclosure.

FIGS. 3 to 5 show visual control and auditory control by the system that may include the signal processing controller 10, artificial intelligence, vehicle sensor 30, visual device 40, and audio device 50. Referring to the artificial intelligence shown in FIG. 3, the artificial intelligence 20 may be associated with visual control configured to determine a shifting pattern based on a driving mode determination and a virtual engine RPM change under a shifting event condition and an auditory control configured to perform acceleration sound control based on an acceleration condition vibration signal and sound control by a virtual engine RPM change under the shifting event condition.

In particular, the artificial intelligence communicates with the signal processing controller 10, vehicle sensor 30, visual device 40, and audio device 50, and may include of an input DB 21, a logic processor 23. An output DB 25 may be configured to transmit and receive virtual engine RPM to and from the visual device 40 and determines a sound control amount in response to a vibration signal based on the virtual engine RPM in relation to the auditory device 50. In particular, the artificial intelligence 20 may include an analog to digital (AD) digital to analog (DA) control board as a control data I/O unit for audio-visual control. Further, the input DB 21 and the output DB 25 may be an engine sound color control map 10-1.

For example, the input DB 21 may be configured to communicate with the signal processing controller 10, vehicle sensor 30, and visual device 40. An audio device 50, may have sound control transmission system characteristic data based on a vibration signal, shifting pattern data for driving modes, virtual engine RPM change pattern data, and big data of interior microphone noise data in a data base (DB) and may be configured to communicate with the logic processor 23. The logic processor 23 may be configured to perform artificial intelligence processing with an artificial algorithm based on deep learning (e.g., machine learning). The output DB 25 may include virtual engine RPM selection data that considers a dynamic characteristic and target control sound color or sound pressure (e.g., volume) selection data that considers an auditory effect in a DB (data base).

Referring to the system configuration of FIG. 4, the artificial intelligence 20 may implement a visual effect through the dashboard 41 by performing the visual effect execution mode in S20 in connection with the signal processing controller 10 and the visual device 40.

As shown in the figure, the artificial intelligence 20 may be configured to transmit a virtual engine RPM set value (for example, in S16 of FIG. 6) as a calculate target virtual engine RPM set value to the signal processing controller 10. The signal processing controller 1 may be configured to match the virtual engine RPM change target value of the engine sound color control map 10-1 to the virtual engine RPM set value and output a virtual engine RPM instruction to the dashboard 41. Then, the dashboard 41 may be configured to generate a visualization image based on the virtual engine RPM. In particular, the signal processing controller 10 may be configured to output a virtual engine RPM instruction while maintaining communication with the dashboard 41 and the artificial intelligence 20 collects actual engine RPM information of the dashboard 41 through the input DB 21 and may apply the information to calculation of the virtual engine RPM set value.

Referring to the auditory control system configuration for volume control of FIG. 5, the artificial intelligence 20 may implement an auditory effect through the speaker 5 by performing the auditory effect execution mode in S40 in connection with the signal processing controller 10 and the audio device 50. As shown in the figure, the signal processing controller 10 may be configured to associate the virtual engine RPM output value of the artificial intelligence 20 to the dashboard 41 (e.g., in S10-1) with the output DB 25 of the artificial intelligence 20, thereby dividing the sound output of the speaker 51 into acceleration condition sound and shifting condition sound. In particular, the acceleration condition sound may be based on a gear stage number (S32) and the shifting condition sound may be based on the accelerator pedal position (S33), and may be used to output dynamic sound, sports sound, or lilting sound.

Figure 6:
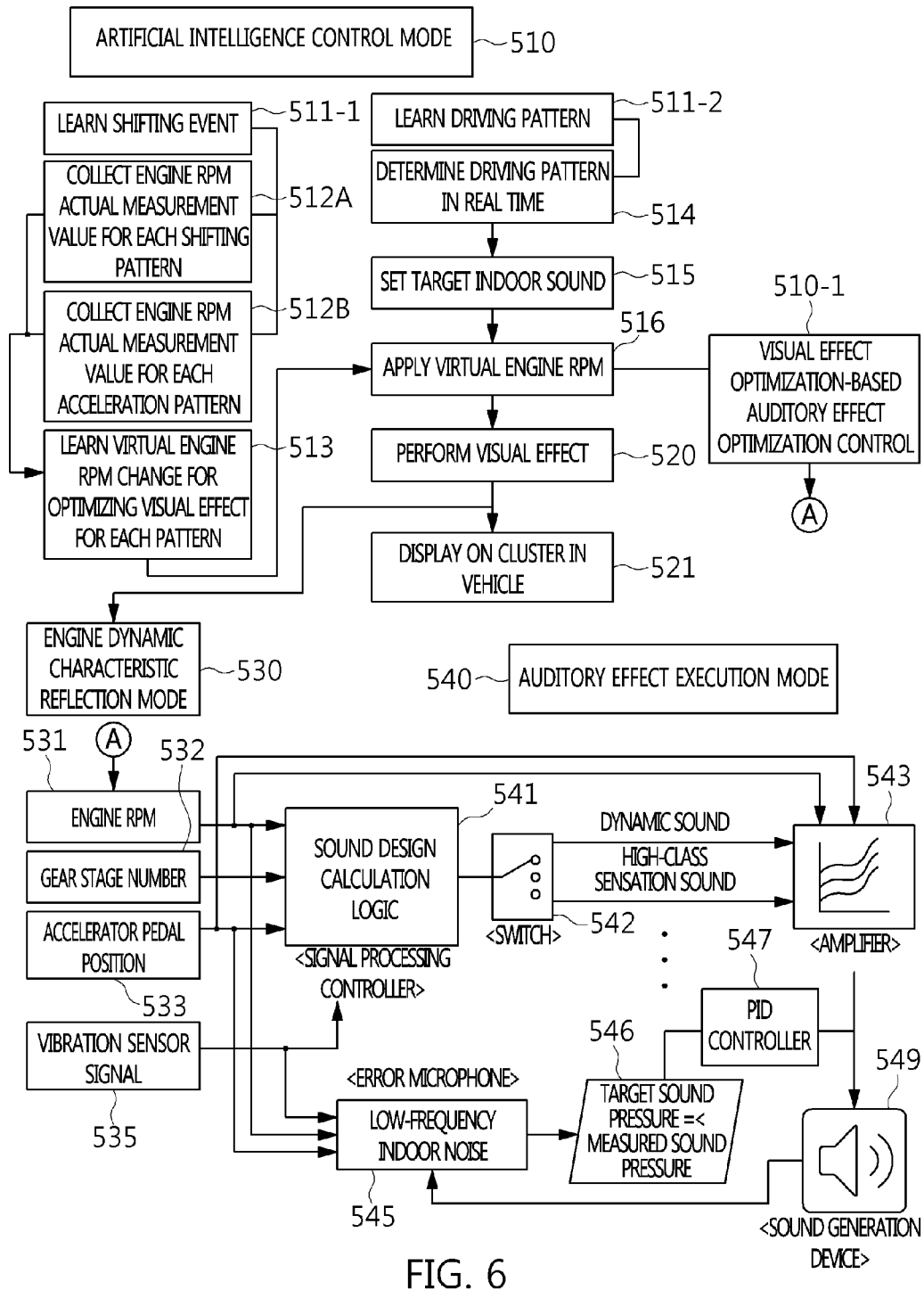
FIG. 6 is an exemplary detailed flowchart showing an engine sound color control based on an engine dynamic characteristic with an artificial intelligence according to an exemplary embodiment of the present disclosure.

FIG. 6 is an exemplary detailed view showing a sound color control method based on artificial intelligence, which is described in detail with reference to FIGS. 7 to 9. In particular, the control subjects may include the signal processing controller 10 and the artificial intelligence 20, and the control objects may be the visual device 4 and the audio device 50.

The artificial intelligence control mode of S10 may be divided into a shifting event learning step of S11-1 and a driving pattern learning S11-2, that may be performed by the logic processor 23 of the artificial intelligence 20 applying a detection value of the vehicle sensor 30 together with construction data of the input DB 21. The shifting event learning S11-1 may be performed by a virtual engine RPM change learning progress step for visualization optimization for shifting and acceleration patterns of S13 connected to an engine RPM actual value collection step for shifting patterns of S12A and an engine RPM actual value collection step for acceleration patterns of 12B. Accordingly, the artificial intelligence 20 may be configured to perform virtual engine RPM change learning through the logic processor 23 through the shifting event learning S11-1 and the learned virtual engine RPM change may be provided to the virtual engine RPM S16 through the output DB 25.

The driving pattern leaning S11-2 may be performed into a driving pattern rear-time determination step of S14, an interior target sound setting S15, and a virtual engine RPM application S16. In particular, the logic processor 23 of the artificial intelligence 20 may be configured to calculate the virtual engine RPM setting value S16 from the interior target sound set based on the actual driving pattern and the learned virtual engine RPM change S13. Accordingly, the artificial intelligence 20 may be configured to perform a virtual effect execution mode S20 by outputting the virtual engine RPM setting value to the signal processing controller 10 through the output DB 25. Further, the artificial intelligence 20 may be configured to perform an auditory effect execution mode S40 by transmitting the virtual engine RPM setting value through the output DB 25 to the signal processing controller 10 to reflect an auditory effect optimization control factor based on the visual effect optimization S10 to the engine dynamic characteristic mode reflection mode S30.

Figures 7A, 7B:
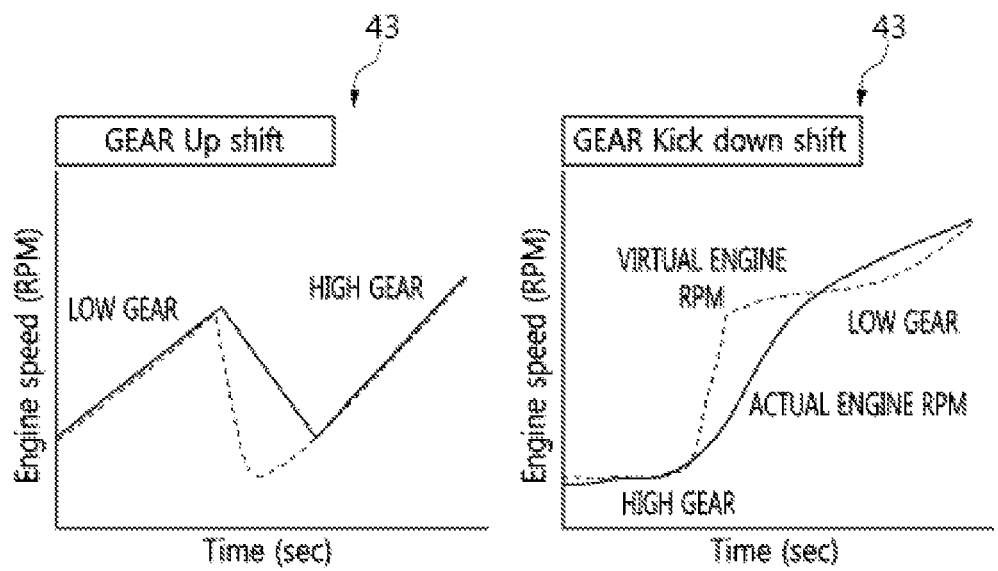
FIGS. 7A and 7B are exemplary views showing an example of a visual effect graph according to an exemplary embodiment of the present disclosure.

FIG. 7 shows an example a visual expression graph 43 implemented at a virtual engine RPM by the dashboard 41 about a gear up-shifting pattern and a gear kick-down shifting pattern. In particular, the solid line shows the actual engine RPM without visualization and the dotted line shows a virtual engine RPM with visualization. As shown, the visualization effect may be maximized in both in shifting from a low gear to a high gear in the gear up-shifting pattern and shifting from a high gear to a low gear in the gear kick-down shifting pattern through rapid response by a dynamic and quick RPM gauge change.

Referring to FIG. 6, the auditory effect execution mode S40 may be performed by applying the engine dynamic characteristic reflection mode S30. Accordingly, auditory control in which the virtual RPM produced based on artificial intelligence in the visual controller may be suitable for a rapid RPM gauge change based on a shifting event implemented through speakers internal and external to an engine compartment or speakers within the vehicle.

The engine dynamic characteristic reflection mode S30 may be implemented as a sensor signal detection configured to detect the engine RPM of S41, the gear stage number S32, the accelerator pedal position S33, and the vibration sensor signal S34. The engine RPM of S31 may be the virtual engine RPM of S16, the gear stage number of S32 may be a gear state that is a detection value applied to the shifting state of the vehicle 1, and the accelerator pedal position S33 may be the engagement amount of the accelerator pedal (e.g., an accelerator position scope) that is a detection value that is applied to the shifting state determination of the vehicle 1. In particular, the accelerator pedal position may be detected by an accelerator pedal position sensor and the gear stage may be detected by an inhibitor switch. The vibration sensor signal S34, that shows engine vibration based on operation of the engine 1-1, may be a detection value of the vibration sensor 31 (or pressure sensor 33).

Figure 8:
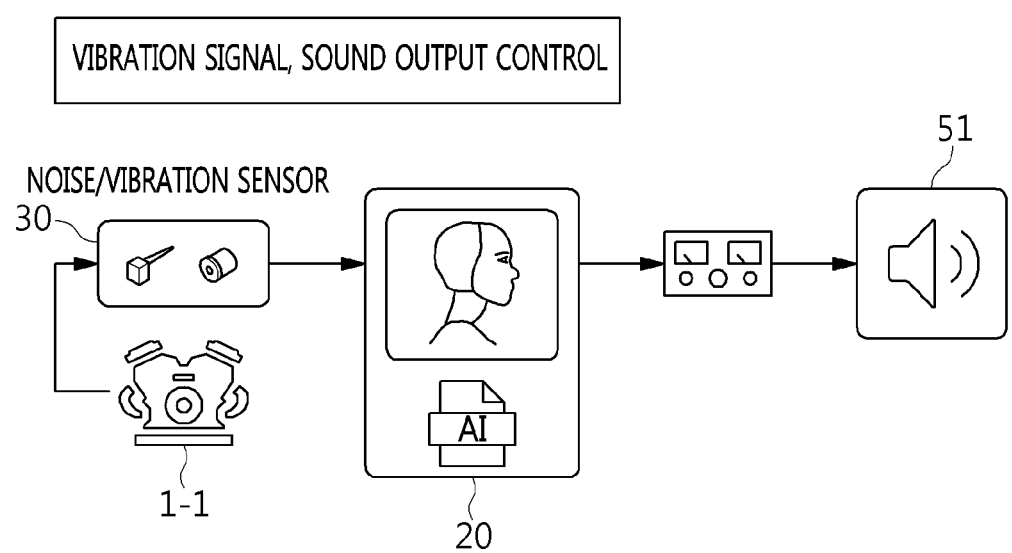
FIG. 8 is an exemplary view showing the state in which an engine dynamic characteristic of a vehicle for implementing an auditory effect according to an exemplary embodiment of the present disclosure is produced on the basis of a vibration signal.

Referring to FIG. 8, the vibration sensor 31 or the pressure sensor 33 of the vehicle sensor 30 may be configured to detect engine dynamic characteristics of the engine 1-1 as vibration signals. Then the artificial intelligence 20 implements a visual effect considering the engine vibration by producing output sound of the speaker 41 based on the virtual engine RPM change with reference to the sound color and volume related to the vibration signals in cooperation with the signal processing controller 10. The auditory effect execution mode S40 may be implemented through sound design calculation S41, sound selection S42, a sound sensation selection step of sound amplification S43, low-frequency interior noise detection S45, target and measured sound pressure comparison S46, an interior noise regulation step of PID output S47, and a sound generation step S49.

In particular, the auditory effect execution mode may be performed by the signal processing controller 10 in relation to the artificial intelligence 20. The signal processing controller 10 may include a sound calculation unit configured to perform the sound sensation selections step (performs S41), a switch (performs S42), an amplifier (performs S43), a noise processor configured to perform the interior noise regulation step (performs S45), a sound pressure comparison unit (performs s46), and a PID controller (performs S47). The sound generation step S49 may be performed by the speaker 51.

In the sound design calculation S41, the sound calculation unit may be configured to perform shifting determination using a virtual engine RPM and a gear stage number and acceleration determination using an accelerator pedal position, and extract in real time an engine order component that is a main factor of the interior sound color of the vibration signal representing the engine power performance using the vibration signal. Then, a virtual engine sound color may be selected or calculated for dynamic sound and high-class sensation sound by matching the component with the data of the engine sound color control map 10-1. During the sound selection S42, the switch may be configured to output the dynamic sound or the high-class sensation sound of the sound calculation unit. During the sound amplification S43, the amplifier may be configured to amplify the dynamic sound or the high-class sensation sound with reference to the engine RPM and the accelerator pedal position.

During the low-frequency interior noise detection S45, when the engine RPM, the accelerator pedal position, and a low frequency of a noise component from a vibration signal, the noise processor may be configured to detect a low-frequency noise together with the feedback error microphone noise of the speaker 51. The target and measured sound pressure comparison S46, may be configured to compare a measured sound pressure of the low-frequency noise output from the noise processor with a target sound pressure and may then be configured to output a target sound pressure signal to the PID controller when the target sound pressure is not equal to or less than the measured sound pressure. During the PID output S47, the PID controller may be configured to receive the target sound pressure signal from the sound pressure comparing unit and regulate the dynamic sound or the high-class sensation sound from the amplifier of S43 to the target sound pressure. In particular, the target sound pressure may be output through one of proportional, integral and differential or output through PID.

In particular, during the sound generation S49, the speaker may be configured to generate the dynamic sound or the high-class sensation sound to which the target sound pressure is applied. Accordingly, audio-visual synergy may be implemented by the visual effect of the dashboard 41 and the auditory effect by sound color and volume control.

Figures 9A, 9B:
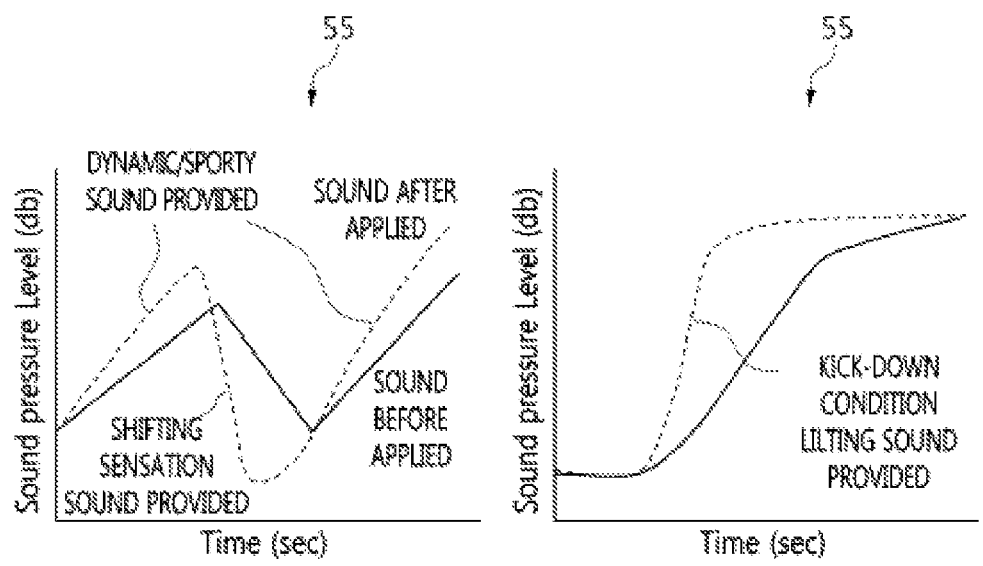
FIGS. 9A and 9B are exemplary views showing an example of a visual effect graph according to an exemplary embodiment of the present disclosure.

FIGS. 9A and 9B are example showing an auditory expression graph 55 implemented by dynamic sound or high-class sensation sound by the speaker 51 in a gear up-shifting pattern and a gear kick-down shifting pattern. In particular, the solid line shows engine sound without an auditory effect applied and the dotted line shows engine sound with an auditory effect of dynamic sound applied. The auditory effect of sporty and lilting sound from the dynamic sound pressure according to the gear up-shifting patter from a low gear to a high gear and the dynamic sound pressure according to the gear kick-down shifting pattern from a high gear to a low gear may be applied.

Accordingly, the engine sound color control may provide audio-visual pleasance and fun-to-drive to a driver by generating a synergy effect by reflecting the engine dynamic characteristic based on artificial intelligence including the visual effect of the dashboard 41 and the auditory effect of the speaker 51. In particular, the engine sound color control may provide a dynamic sound color through the auditory effect and sporty and lilting sound while showing rapid shifting through the visual effect maximized in the viewpoint of a driver, and may improve sensation quality together with the dynamic characteristic of the vehicle through the audio-visual synergy effect related to the vehicle performance.

As described above, the engine sound color control method based on an engine dynamic characteristic with artificial intelligence maximizes audio-visual control through the audio-visual synergy effect by performing both of the visual control of the dash board 41 by the artificial intelligence 20 using the virtual RPM based on the shifting event and driving pattern of a vehicle. The auditory control of the speaker 51 may be operated by the signal processing controller 10 based on the engine RPM in response to an engine vibration signal of the engine 1-1. Further, a driver may be provided with improved rapid response with simple vehicle power performance control through a real-time audio-visual change regulated by the artificial intelligence.

The vehicle of the present disclosure has the following operation and effects by implementing engine sound color control on the basis of an engine dynamic characteristic using artificial intelligence.

First, fun-to-drive may be improved by harmonically controlling driver's auditory sense and visual sense.

Second, a visual effect and an auditory effect may be harmonically optimized since real-time sound color control using an auditory extraction volume being in proportion to engine RPM and a change speed visualization control using optimal visual extraction virtual RPM may be based on artificial intelligence learning model.

Third, an engine order component (e.g., a component generated by rotation) required for sound color control may be extracted through real-time measurement of a vibration signal representing the power performance of an engine and an auditory effect may be implemented using a target sound color calculated from the component through an output device in an engine compartment or the interior.

Fourth, the limits of existing virtual sound source may be overcome through interior sound color control using the peculiar dynamic characteristic of an engine and more actual interior sound may be implemented based on an engine vibration signal, whereby auditory Noise, Vibration, Harshness (NVH) may also be reduced.

Fifth, the optimal virtual engine RMP obtained by learning a driving pattern of a driver in each driving mode may be displayed on a cluster, so a virtual effect of a rapid response misunderstanding effect due to rapid progress of a changing speed of engine RPM may be maximized.

Sixth, a sound color control technology that overcomes the limits in the virtual sound source generation type and the virtual RPM type may be provided, the commercial quality of a vehicle may be improved.

While the present disclosure has been described with respect to the exemplary embodiments, it will be apparent to those skilled in the art that various changes and modifications may be made without departing from the spirit and scope of the disclosure as defined in the following claims.

What is claimed is:

1. An engine sound color control method, comprising:
    applying, by a signal processing controller, a virtual engine Revolution Per Minute (RPM) to visual control of a dashboard; and
    applying, by the signal processing controller, an engine dynamic characteristic to auditory control of a speaker,
    wherein the virtual engine RPM is based on a shifting event and a driving pattern by an artificial intelligence and the engine dynamic characteristic is based on an engine vibration signal received from the signal processing controller.

2. The method of claim 1, wherein a virtual engine RPM change is detected by learning the shifting event, an interior target sound is determined by the driving pattern in real time, and the virtual engine RPM is set by combining the virtual engine RPM change and the interior target sound.

3. The method of claim 2, wherein the virtual engine RPM change is based on an engine RPM actual measurement value of the shifting event.

4. The method of claim 3, wherein the engine RPM actual measurement value is divided into an engine RPM actual measurement value for each shifting pattern and an engine RPM actual measurement value for each acceleration pattern.

5. The method of claim 1, wherein the auditory control implements a plurality of sound colors by discriminating sound.

6. The method of claim 5, wherein the sound is distinguished by combining the virtual engine RPM, a gear stage number, and an accelerator pedal position with the engine vibration signal.

7. The method of claim 6, wherein the sound is distinguished by switching.

8. The method of claim 5, wherein the auditory control is configured to reflect low-frequency noise.

9. The method of claim 8, wherein the low-frequency noise is reflected after the sound is determined.

10. A vehicle comprising an engine sound color generation device that implements both of visual control and auditory control.

11. The vehicle of claim 10, wherein the engine sound color generation device includes:
    a signal processing controller configured to receive an engine vibration signal based on operation of an engine;
    artificial intelligence configured to set virtual engine revolution per minute (RPM) by learning a shifting event and determining a driving pattern;
    a vehicle sensor configured to detect and transmit the engine vibration signal to the signal processing controller;

a visual device configured to implement visual control on based on the virtual engine RPM; and an auditory device configured to implement auditory control by combining the virtual engine RPM with the engine vibration signal.

12. The vehicle of claim 11, wherein the artificial intelligence is configured to detect a virtual engine RPM change based on an engine RPM actual measurement value by learning the shifting event, is configured to determine a target interior sound by determining the driving pattern in real time, and is configured to determine the virtual engine RPM based on the virtual engine RPM change and the target interior sound.

13. The vehicle of claim 12, wherein the artificial intelligence is configured to determine the engine RPM actual measurement value into an engine RPM actual measurement value for each shifting pattern and an engine RPM actual measurement value for each acceleration pattern.

14. The vehicle of claim 11, wherein the signal processing controller is configured to combine the virtual engine RPM, a gear stage number, and an accelerator pedal position with the engine vibration signal in the auditory control, and perform the auditory control by determining dynamic sound to which low-frequency noise is applied and high-class sensation sound.

15. The vehicle of claim 14, wherein the signal processing controller is configured to determine the dynamic sound and the high-class sensation sound by switching.

16. The vehicle of claim 14, wherein the signal processing controller reflects the low-frequency noise to Proportional/Integral/Differential (PID) output.

17. The vehicle of claim 11, wherein the vehicle sensor includes a vibration sensor configured to detect the engine vibration signal or a pressure sensor configured to measure intake pressure or exhaust pressure of the engine.

18. The vehicle of claim 11, wherein the visual device is a dashboard.

19. The vehicle of claim 11, wherein the auditory device is a speaker and the speaker is an engine compartment speaker, an interior speaker, or an audio speaker.

* * * * *